United States Patent
Savoie et al.

(10) Patent No.: US 7,320,382 B2
(45) Date of Patent: Jan. 22, 2008

(54) DEER STAND

(76) Inventors: R. Michael Savoie, 2689 Princess Ave., Lake Charles, LA (US) 70607; David J. Foreman, Sr., 191 Long Aere Dr. #32, Lake Charles, LA (US) 70607

(*) Notice: Subject to any disclaimer, the term of this patent is extended or adjusted under 35 U.S.C. 154(b) by 345 days.

(21) Appl. No.: 11/076,000

(22) Filed: Mar. 9, 2005

(65) Prior Publication Data
US 2006/0225957 A1    Oct. 12, 2006

(51) Int. Cl.
*E06C 5/00* (2006.01)
(52) U.S. Cl. ..................... 182/127; 182/115
(58) Field of Classification Search ............ 182/127, 182/63.1, 115, 116, 201
See application file for complete search history.

(56) References Cited

U.S. PATENT DOCUMENTS

| | | | | |
|---|---|---|---|---|
| 2,507,329 A | * | 5/1950 | Bailey | 16/261 |
| 4,442,919 A | * | 4/1984 | Fulcher | 182/63.1 |
| 4,614,252 A | * | 9/1986 | Tarner | 182/116 |
| 4,671,383 A | * | 6/1987 | Huang | 182/204 |
| 4,744,441 A | * | 5/1988 | Sandstrom | 182/111 |
| 5,409,081 A | * | 4/1995 | Reeves | 182/63.1 |
| 6,290,023 B1 | * | 9/2001 | Martin | 182/127 |
| 6,739,428 B1 | * | 5/2004 | Holmes et al. | 182/127 |

* cited by examiner

*Primary Examiner*—Alvin Chin-Shue
(74) *Attorney, Agent, or Firm*—Keaty Professional Law Corporation (57) ABSTRACT

A deer stand is pivotally mountable on a back rack of an ATV. When erected to an upright position the deer stand is stabilized by the mass of the ATV, preventing collapse of the stand due to wind or other such forces. When being transported to the location, the stand is pivoted onto its side, with the front portion being securable to a front rack of the ATV.

4 Claims, 6 Drawing Sheets

DEER STAND

The present invention relates to movable portable stands, supports, hunter's platforms, etc for use in the field. More specifically the present invention relegates to a stand, which may be carried on a small off road vehicle, such an all terrain vehicle, and erected on site by one or more persons.

Hunters, sport enthusiasts, nature photographers and other individuals have long appreciated an elevated position for viewing the surrounding area. Deer hunters are particularly interested in using a platform that is well elevated above the undergrowth to better spot animals in the field and in the forest. Some of the known platforms are mounted on trees, some are designed to elevate the person using hand operated winches, hydraulic winches, and other power machinery. Basically, most of the stands compromise some type of platform that can be accessible form the ground for the hunter by either a ladder, or movable chair and the like. Many hunters and sport enthusiasts prefer to use portable supports that do not require winches or trees for installation. The portable deer stands are usually transported to a site by a truck or other power vehicle where the stand is erected in the field. However, many deer platforms or deer stands are relatively heavy, requiring two or more persons for proper installation. If the support is lightweight, there is a danger of it being overturned by wind or movement of the hunter on the platform, which may lead to a collapse of the support and injury of the person or persons on the platform.

The present invention contemplates elimination of drawbacks associated with conventional deer stands and provision of a lightweight, portable, easily erectable support mountable on an all terrain vehicle, which provides stability to the erected super structure.

SUMMARY OF THE INVENTION

It is, therefore, an object of the present invention to provide a utility stand for use by photographers, hunters, forest rangers, and other personnel who require a portable easily erectable elevated viewing platform.

It is another object of the present invention to provide an elevated viewing platform that can be erected by one person.

These and other objects of the present invention are achieved through a provision of through a provision of a structure pivotally mountable on a rack of an all-terrain vehicle. The structure has a front portion, which pivotally engages the back rack of the ATV and a front portion, which defines a ladder. The upper ends of the front portion and the back portion support an elevated platform, which accommodates one or more users. The platform has a lightweight mesh floor with a solid plate mounted thereon. An opening in the solid plate allows positioning of a seat pedestal on the platform.

Each leg of the front portion and the back portion is provided with a means for independent leveling in relation to the ground. A lower portion of each leg carries an internally threaded nut, which receives a bolt in a threaded engagement therein. The bolt is configured for resting on the ground, and when the bolt is rotated, the nut with the attached leg moves a pre-determined distance up or down.

The platform is provided with a plurality of upright members extending from the floor. The upright members support a wrap-around railing, which serves as a rest for a rifle, photography equipment and the like.

BRIEF DESCRIPTION OF THE DRAWINGS

Reference will now be made to the drawings, wherein like parts are designated by like numerals.

DETAILED DESCRIPTION OF THE PREFERRED EMBODIMENT

Turning now to the drawings in more detail, numeral 10 designates the apparatus of the present invention. The deer stand, or structure 10 comprises a front portion 12 and a rear portion 14. The front portion 12 is adapted for pivotal engagement with a rack of an all terrain vehicle schematically shown in FIG. 1 and designated by numeral 16.

Figure 12:
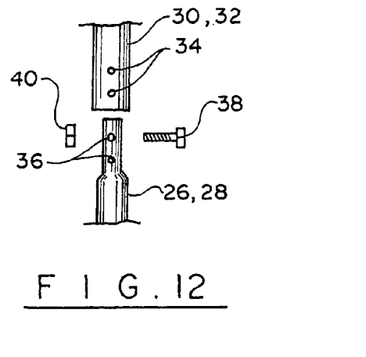
FIG. 12 is a detail view of the ladder portion showing telescopic connection.
Figure 13:
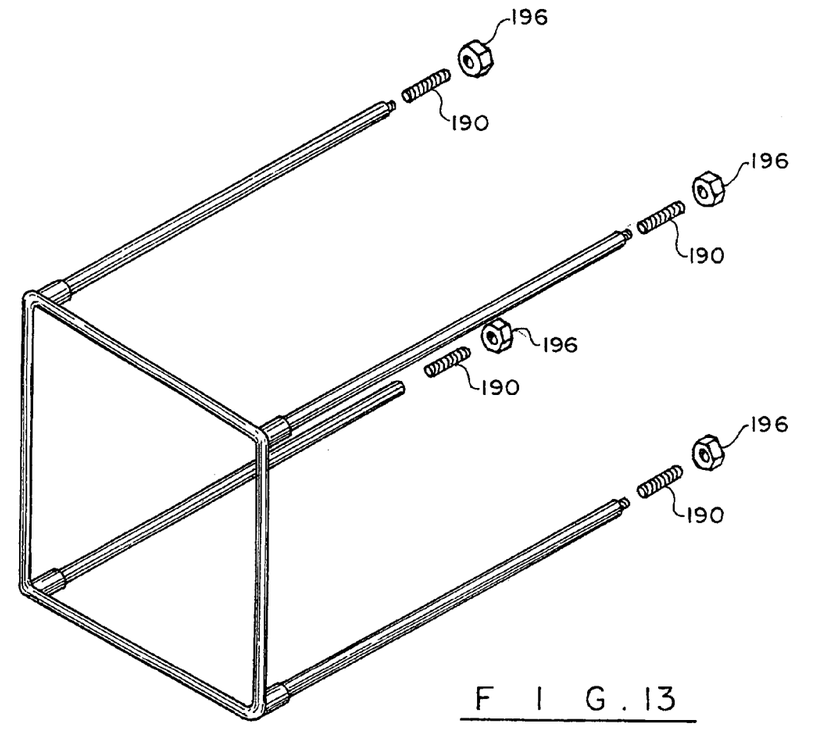
FIG. 13 is detail view showing the platform lowered on its side.
Figure 14:
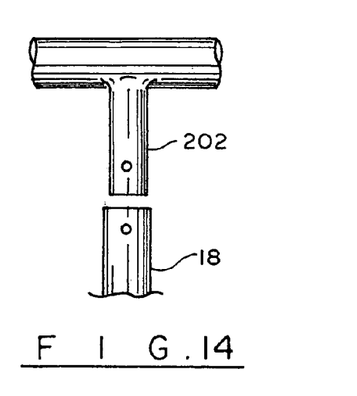
FIG. 14 is detail view illustrating a pin and leg connection for the top rail.
Figure 15:
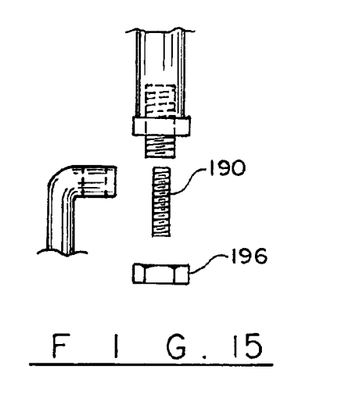
FIG. 15 is detail view illustrating the leg detail supporting the top rail.

The front portion 12 comprises a pair of spaced-apart legs 18 and 20 that can be disassembled by breaking out connections 22 and 24 which help secure upper and lower parts of the legs 18, 20 together. FIG. 12 illustrates a manner of connecting lower portions 26, 28 of the legs 18 and 20 and upper portions 30, 32 of the legs 18, 20, respectively. As can be seen in FIG. 12, each upper portion 30, 32 is formed as a tubular body provided with one or more through openings 34. The lower portions 26, 28 are each formed as a tubular body with through openings 36. The external dimensions of the lower portions 26, 28 are slightly smaller than the size of an interior opening of the upper portions 30,32 allowing a slidable telescopic engagement between the portions 30, 32 and 26, 28. A securing bolt 38 is provided for positioning through the openings 34 and 36, once the lower portion 26, 28 is inserted into the upper part 30, 32. The bolt passes through aligned openings 34 and 36 and is secured on the opposite side with a threaded nut 40.

Figures 16, 16A, 17, 18, 19, 20:
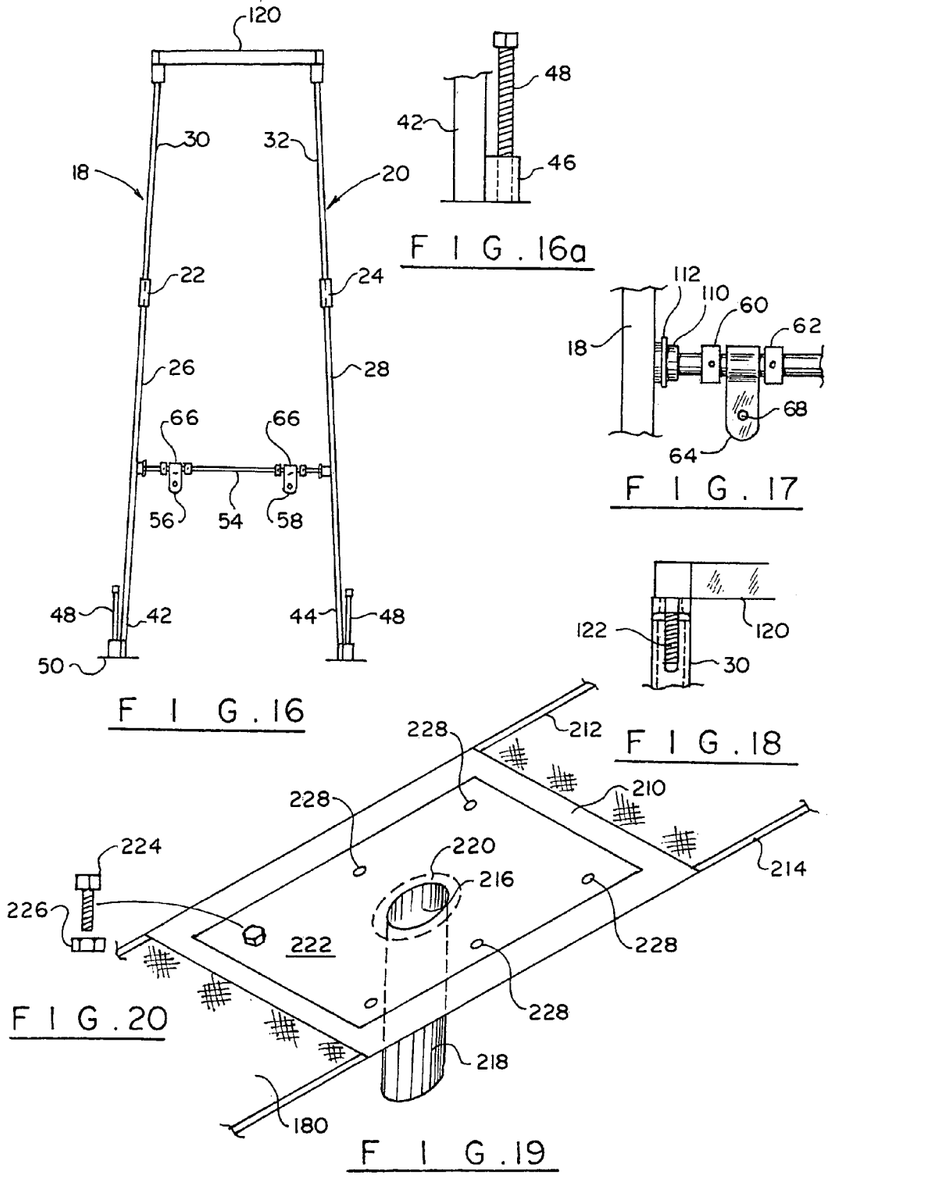
FIG. 16 is a detail view illustrating the front portion of the apparatus of the present invention.
FIG. 16a is a detail view illustrating the means for adjusting position of the front portion legs on the ground.
FIG. 17 is a detail view showing a portion of the pivotal attachment assembly of the apparatus of the present invention.
FIG. 18 is a detail view illustrating the means for securing an upper transverse brace of the front portion to a leg.
FIG. 19 is a detail perspective view of the central portion of the platform in accordance with the present invention showing a receiver for a seat pedestal.
FIG. 20 is detail view illustrating a means for securing the seat pedestal attachment plate to the floor of the platform.

The lowermost portions of the legs 18 and 20 are provided with a means for leveling position of each of the legs on the ground. As can be seen in FIGS. 16 and 16A, the lowermost portion 42 and 44 carries an internally threaded nut 46. An elongated bolt 48 is threadably received within the nut 46. The lower portion of the bolt 48 can be driven into the ground 50 or can simply rest on the ground. By rotating the bolt 48, the user moves the nut 46 and the associated leg 42 along the vertical height of the bolt 48, thereby allowing adjusting individual position of a respective leg on the ground.

A lower transverse brace 54 is secured between opposing legs 18 and 20. The transverse bar 52 carries a pair of securing bracket assemblies 56, 58. Each bracket assembly 56 and 58 comprises a pair of locking sleeves 60, 62, mounted in a surrounded relationship over the transverse brace 54. Secured to the transverse bar between the locking sleeves 60, 62 is a means for pivotally securing of the front portion on a vehicle rack. The pivotal securing means comprises a receiving plate and an attachment plate. The attachment plate 64 is secured on the transverse brace 54 with the help of a tubular sleeve 66. The sleeve is adapted for free pivotal movement about the transverse brace 54. The sleeve 66 is unitary connected to the plate 64.

Figures 21, 22, 23, 24:
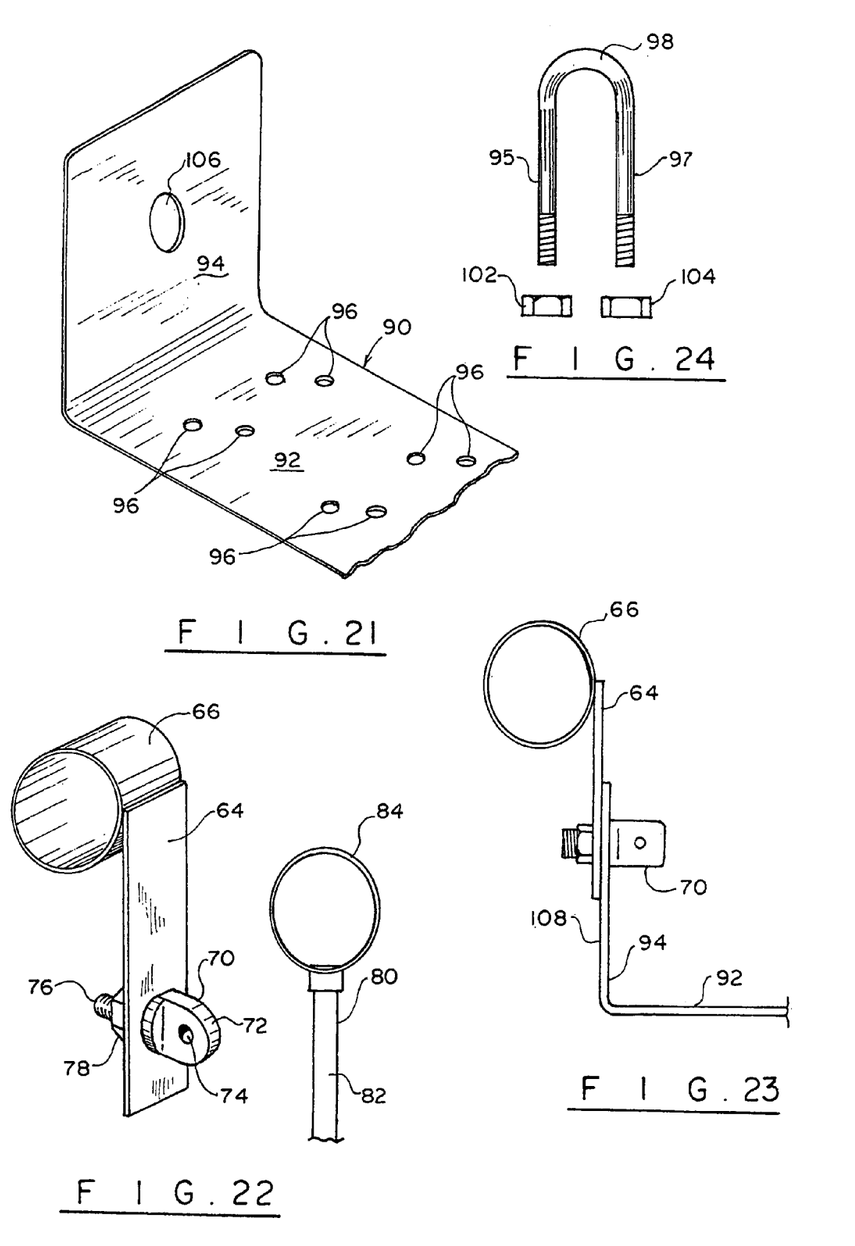
FIG. 21 is a detail view of a receiving plate for securing the apparatus of the present invention to the vehicle rack.
FIG. 22 is a detail view of an attachment member for use with the receiving plate.
FIG. 23 is a side view of the receiving plate with an attachment member secured thereto.
FIG. 24 is a detail view illustrating a U-shaped bolt for attaching the receiving plate to the vehicle rack.

An opening 68 is defined in the plate 64 and is adapted to receiving an attachment pin 70 (FIGS. 22, 23) therein. The attachment pin 70 comprise a pin head 72 formed with a through opening 74 and a threaded portion 76 which extends on the opposite side of the plate 64 once the attachment pin is passed through the opening 68. A securing nut 78 secures position of the pin 70. A locking pin 80 has a stem 82 and the pull ring 84. The pin stem 82 is adapted for passing through the opening 74 of the attachment pin 70.

Each of the bracket assemblies 56 and 58 further comprises a receiving plate 90 configured as an L-shaped body having a first portion 92 and a second portion 94. The first portion 92 is provided with a plurality of bolt receiving openings 96 which are sized an shaped to receive opposing legs 95, 97 of a U-shaped bolt 98. Depending on the orientation of the bars on a back rack 100 of the vehicle 16, the U-Shaped bolt is engaged through respective openings 96. A pair of securing nuts 102 and 104 are provided for securing position of the U-shaped bolt 98 in relation to the receiving plate 90 and the bars of the rack 100.

As can be seen in the drawings, the portion 94 of the receiving plate 90 is oriented at a substantially right angle in relation to the portion 92. The portion 94 of the receiving plate 90 is provided with a through opening 106. When the receiving plate 90 is installed on the back rack 100, the attachment plate 64 is moved into contact with the back 108 of the vertical part 94. The openings 68 and 106 are aligned and the attachment pin 70 is passed through the opening 106, through the opening 68, thereby attaching the plate 64 with the receiving plate 90 by the pin 70 and the securing pin 80. Once the assembly is in place, the structure 10 can pivot about the lower transverse brace 54 while being secured to the transverse brace 54 and the back rack 100.

When the securing pin 80 is removed, the pivotal movement of the super structure 10 in relation to the back rack 100 is allowed. Such pivotal may be needed when the deer stand is transported from one location to another without the need to disassemble the stand into it smaller components. In the down position, the stand 10 is moved to elevate the legs from the ground and cause the front portion 12 to lie against the ATV structure. The front portion is temporarily secured to the front rack, as will be described in more detail hereinafter.

Turning back to FIG. 17, the detail of engagement of the transverse brace 54 with the leg 18 is shown is further detail. As can be seen in the drawings, an outermost end of the transverse brace 54 carries a sleeve 110 with a cap 112 for engaging with the leg 18. It will be understood that the opposite end of the lower transverse brace 54 similarly engages the leg 20.

As can be seen in more detail in FIGS. 16 and 18, the front portion 12 of the structure 10 is provided with an upper transverse brace 120. The transverse brace 120 has a pair of engaging rods 122 extending at a right angle on opposite ends of the brace 120. A rod 122 is configured for slidable engagement with the tubular legs 18 and more specifically the upper portions 30 and 32 of the legs 18 and 20. The telescoping connection allows to easily assemble and disassemble the upper brace 120 from the legs 18, 20.

The rear portion 14 of the structure 10 comprises a stepladder allowing the user to climb to the top of the structure 10 up to the platform 130. The back portion 14 comprises a pair of parallel legs 132, 134 and a plurality of cross bars, or steps 136 extending between the legs 132 and 134. As can be seen in more detail in FIGS. 1 and 8, the rear portion 14, similarly to the front portion 12, has legs that can be disassembled into the lower and upper parts 132 and 134. The break down connection is shown in FIG. 12 and is similar to the break-apart connection described in relation to the legs 18 and 20 above. The breakdown connections on the legs 132 and 134 are designated by numerals 138 and 140 in FIG. 8.

The lowermost ends 142, 144 of the legs 132 and 134 respectively, rest on and engage with a support bar 146. The support bar 146 extends transversely to the longitudinal extension of the legs 132 and 134. The longitudinal dimension of the bar 146 may be greater than the space between the legs 132, 134, such that the ends of the support bar 146 extend outwardly of the legs 132 and 134, as can be better seen in FIGS. 1 and 8.

Figure 1:
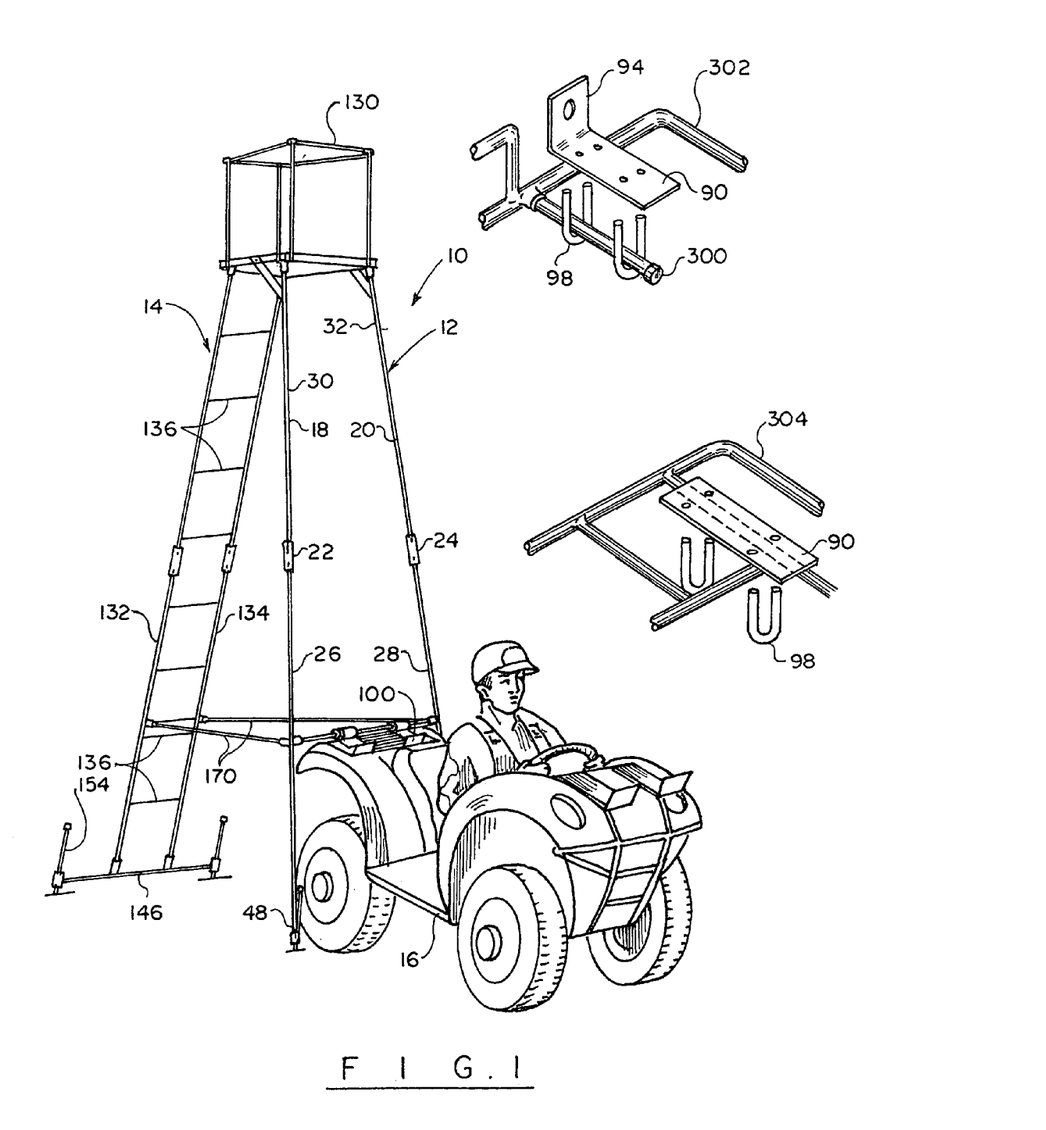
FIG. 1 is a perspective view of the elevated stand in accordance with the present invention supported, in part, by an all terrain vehicle.

The support bar 146 is adapted to rest on the ground 50, in the manner shown in FIG. 1, with the lower portions 142 and 144 engaging open ends of receiving members 148 and 150, which may be fixedly secured to the support bar 146. Opposite ends of the support bar 146 each carry internally threaded nuts 152 which are adapted to move along a support rod 154 that is either driven into the ground 50 or rests on the ground. The rotation of the rod 154 will cause movement of the nut 152 along the height of the rod 154. As a result, vertical and horizontal leveling of the legs 132 and 134 is accomplished for each leg individually.

Figure 11:
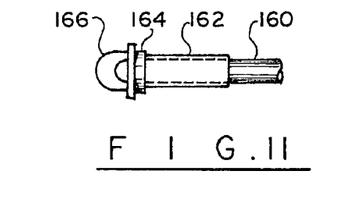
FIG. 11 is a detail view of a pin and sleeve connection between the top of the ladder and the edge of the platform.

The uppermost cross bar 160 of the ladder portion 14 is adapted for engagement with the platform 130. The uppermost cross bar 160 is engaged within a receiving sleeve 162, which is formed as a tubular body. The outermost end of the sleeve 162 is provided with a through opening for receiving a securing pin 164 therethrough. A wire pull 166 is secured to the pin 164 to allow withdrawing of the pin 164 and disengagement of the sleeve 162 from its engagement with the uppermost cross bar 160.

Figures 8, 9, 10:
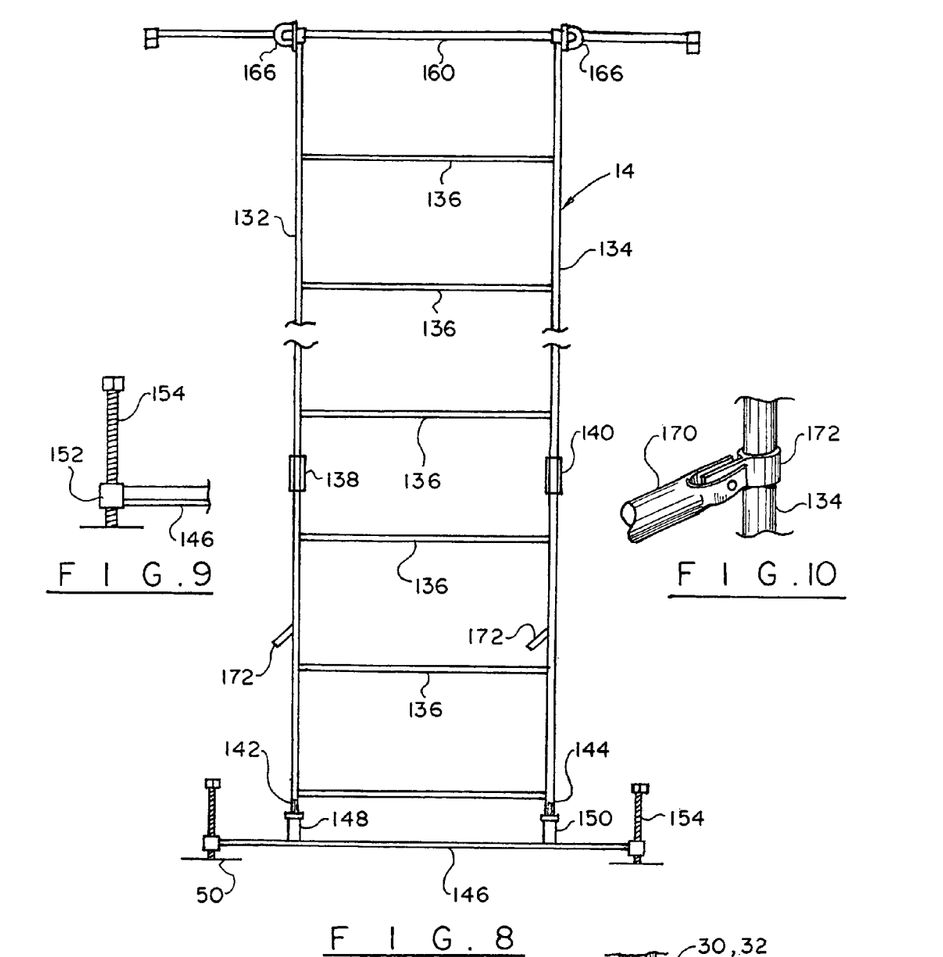
FIG. 8 is a detail view of the ladder portion of the apparatus of the present invention.
FIG. 9 is a detail view illustrating a means for adjusting and leveling of the legs of the structure.
FIG. 10 is a detail view of the ladder support brace.

As can be seen in FIGS. 1, 8 and 10, the portions 12 and 14 are secured together with detachable support braces 170. Each of the support braces 170 carries a supporting member 172, which allows engagement of the legs 132 with legs 26, 132 and 28, 154 together.

Turing now to FIGS. 2-7 and 13-15, the platform of the apparatus of the present invention is seen in more detail. As can be seen in the drawings, the platform 130 comprises a floor 180 formed from a wire or metal lightweight mesh material. The floor 180 rests on the uppermost cross bars 120 and 160 of the portions 12 and 14.

Extending outwardly from the floor 180 is a plurality of upright supports 182, 184, 186 and 188. The lowermost ends of each support 182, 184, 186 and 188 has a threaded bolt 190, which is securable with a corresponding nut 196. The bolts 190 pass through corresponding openings (not shown) formed in the bars 192 and 194, which are secured along the opposing edges of the floor 180. As can be seen in more detail in FIGS. 13 and 15, the bolt 190 secured on the underside of the bars 192 and 194 with the retaining nut 196.

Figures 2, 3, 4, 5, 6, 7:
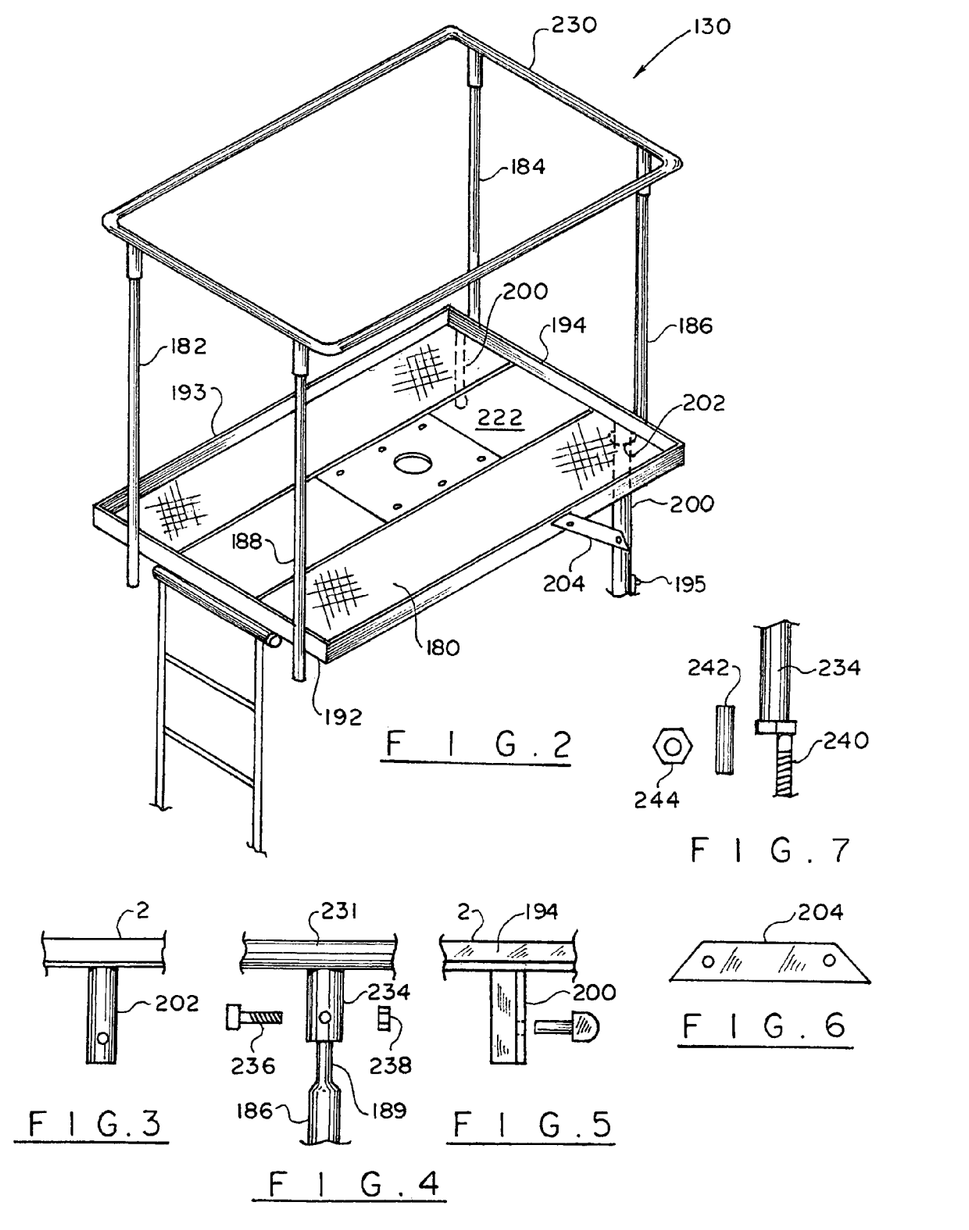
FIG. 2 is a detail perspective view of an elevated platform, which forms a part of the apparatus of the present invention.
FIG. 3 is a detail view of the pin connecting the support leg.
FIG. 4 is detail view of the top rail bracket.
FIG. 5 is detail view of the leg and a pin for securing the platform support.
FIG. 6 is a detail view of the bracket for supporting the leg.
FIG. 7 is a detail view illustrating connection of the top rail and the platform flow leg.

The platform 130 is provided with a means for detachable engaging with the legs 18, 20, 132, and 134. The leg engaging means is shown in FIG. 2 and is designated by numeral 200. The engaging rods 200 extend from the bars 192 and 194, downwardly and fit into an open top of each of the tubular legs 18, 20, 132, and 134. A similar extension 202 (FIG. 3) secures the upright supports to the bars 192 and 194.

To further provide for stability of the platform 130 in relation to the legs of the structure, each leg carries a brace 204 which extents at a angle between the leg and the underside of the reinforcing bars 192, 193, 194 and 195, which are secured to the edges of the floor 180.

The center portion of the floor 180 is provided with an opening for receiving a seat pedestal. As can be seen in detail in FIGS. 19 and 20, a reinforcing frame 210 is secured about a reinforcing plate 222 and longitudinal rails 212, 214 extending along the length of the floor 180. The reinforcing plate 222 has a generally rectangular configuration with a central opening 216, which allows access to a seat pedestal-receiving sleeve 218 extending downwardly from the floor 180. A reinforcing ring 220 surrounds the opening 216 to further prevent damage to the mesh floor 180. The reinforcing plate 222 may be bolted to the floor 180 by a plurality of bolts 224 (FIG. 20), each of which is secured to the underside with a nut 226. The bolted down engagement may be provided in a plurality of strategic locations 228.

Resting on top of the upright supports 182, 184, 186 and 188 is a top railing assembly 230. The railing assembly 230 comprises tubular members forming an enclosure and defining a support surface for a telescope, photography or video equipment, rifles and other such equipment brought to the viewing site by a person using the platform 130. FIG. 4 illustrates a top of an upright member 186 secured with the rail member 231 by a telescoping engagement of the portions 234 with the portion 186, and further securing with a bolt 236 and nut 238. A reduced size portion 189 provided in the uppermost end of an upright member 186 facilitates easy positioning of the upper end within the portion 234.

FIG. 7 illustrates a detail of an alternative securing assembly for the top rail 230. In this embodiment, the top rail has an extension 234, which is provided with a threaded bolt 240 welded thereto. A sleeve 242 is provided for enclosing the bolt portion 240, while the lower part of the bolt 240 is engaged with a nut, which secures the upper part of the upright support 182, 184, 186 and 188 with the rail extension portion 234.

Referring again to FIG. 1, the manner of attachment of the structure 10 to the racks of the all terrain vehicle 16 is shown in more detail. As can be seen in the side detail views, the receiving plate 90 is secured with U-shaped bolt 98 to a bar 300 of the ATV rack 302. When the structure is erected and secured, transferring load to the back of the ATV, the stability of the structure can be significantly increased, since the weight of the ATV is a dead weight supporting the upright position of the structure 10.

When the structure 10 is being transported to the desired sight, the structure 10 is pivotally moved forward such that a portion of the structure 10 rests on a front rack 304 of the vehicle 16. In that case, a securing plate, similar to the receiving plate 90 is used for making a connection between the front rack 304 and the structure 10. One or more U-shaped bolts 98 provided for securing the legs 18 and 20 to the rack 304. In this condition the structure 10 can be transported or repositioned at the desired location.

The structure 10 of the present invention is formed from lightweight tubular and mesh materials; it can be easily assembled by disassembled by disengaging the legs, the platform members and the supports to rest on a truck bed or in a luggage compartment of a car. The structure can be easily assembled by one person, using readily available hand held tools by inserting the appropriate bolts, pins, etc. into the corresponding receivers. The erected stand 10 is supported by the full weight of the all terrain vehicle and provides outstanding stability as compared to conventional deer stands.

Many changes and modifications can be made in the design of the present invention without depart from the spirit thereof. I, therefore, pray that my rights to the present invention be limited only by the scope of the appended claims.

The invention claimed is:

1. A structure mountable to a carrying rack of an all-terrain vehicle, comprising:
   a front portion pivotally attachable to the carrying rack, said front portion being provided with a lower transverse brace, said brace carrying a means for pivotally mounting the front portion to the carrying rack, which comprises an attachment plate having a tubular member secured thereto, said tubular member being configured for mounting in a pivotal relationship about said lower transverse brace, a receiving plate configured for positioning on the carrying rack and detachable securing to the carrying rack and to the attachment plate, and at least one U-shaped bolt extending through openings formed in the receiving plate, said U-shaped bolt securing position of the receiving plate on said carrying rack;
   a back portion detachably securable to the front portion; and
   a platform supported by the front portion and the back portion for supporting a user at an elevated position.

2. A deer stand apparatus mountable to a carrying rack of an all-terrain vehicle, comprising:
   a front portion pivotally attachable to the carrying rack, said front portion comprising a lower transverse brace carrying a means for pivotally mounting the front portion to the carrying rack, said means for pivotally mounting the front portion comprising an attachment plate having a tubular member secured thereto, said tubular member being configured for mounting in a pivotal relationship about said lower transverse brace, a receiving plate configured for positioning on the carrying rack and detachable securing to the carrying rack and to the attachment plate, and at least one U-shaped bolt extending through openings formed in the receiving plate, said U-shaped bolt securing position of the receiving plate on said carrying rack; a back portion detachably securable to the front portion, said back portion comprising a pair of spaced legs and a plurality of cross members forming a ladder; and a platform supported by the front portion and the back portion for supporting a user at an elevated position.

3. The apparatus of claim 2, wherein each of the legs of the front portion and the back portion is provided with an independent adjusting means for leveling position of the respective leg in relation to the ground, said adjusting means comprising an internally threaded nut and a bolt threadably receivable within said nut, said bolt being configured for resting on the ground.

4. The apparatus of claim 2, wherein said platform comprises a mesh floor plate, a plurality of upright members extending vertically from said floor plate and a horizontal railing assembly supported by upper ends of the upright members.

* * * * *